Feb. 25, 1930. N. KOPP 1,748,776
CONNECTER DEVICE
Filed Nov. 22, 1927
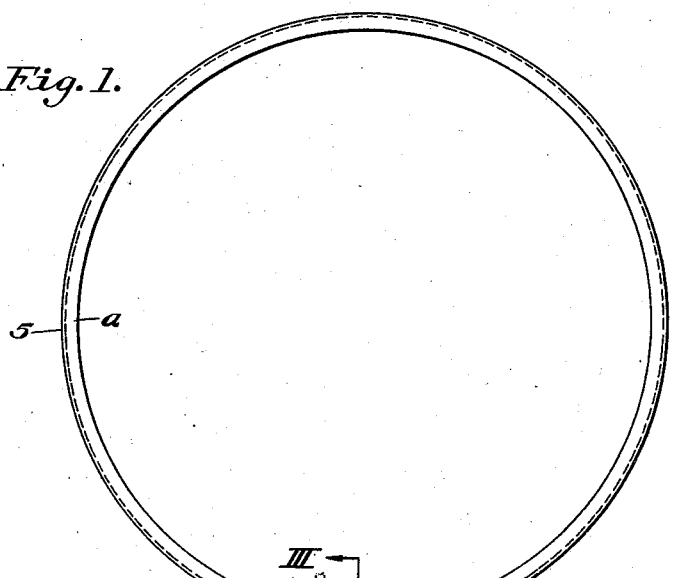
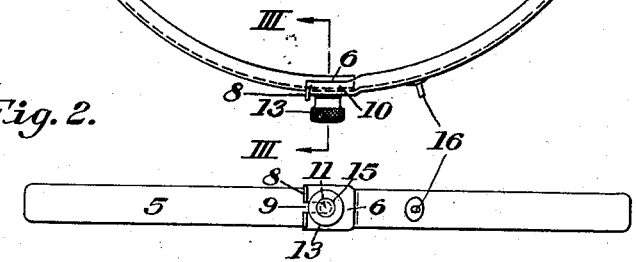
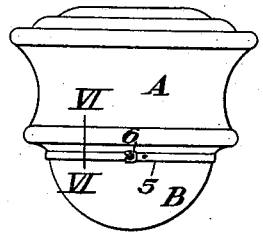
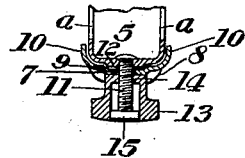
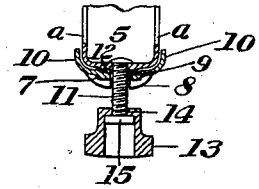
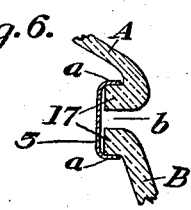

Patented Feb. 25, 1930

1,748,776

UNITED STATES PATENT OFFICE

NICHOLAS KOPP, OF PITTSBURGH, PENNSYLVANIA, ASSIGNOR TO KOPP GLASS, INCORPORATED, OF SWISSVALE, PENNSYLVANIA, A CORPORATION OF PENNSYLVANIA

CONNECTER DEVICE

Application filed November 22, 1927. Serial No. 235,015.

My invention relates to a connecter device, and more particularly to a connecter device especially designed for use with illuminating fixtures or globes comprising a plurality of parts, such, for example, as a two-part illuminating glass globe or bowl, although it may be employed for detachably joining or connecting other parts.

The prime object of the present invention is to provide a connecter of the character specified, of simple and efficient construction, neat in appearance, and one that may be readily manipulated in the operation of connecting and disconnecting the members of a divided or two-part illuminating globe or bowl, such, for example, as ceiling light bowls or globes.

Other objects and advantages of the present invention will be pointed out or become apparent from a consideration of an operative embodiment as hereinafter described and shown in the accompanying drawings.

In the drawings, which illustrate an application of my invention:

Fig. 1 is a top plan view of a connecter device embodying my invention;

Fig. 2, a side elevational view;

Fig. 3, a detail sectional view, the section being taken on line III—III of Fig. 1, showing the connecter in locked position;

Fig. 4, a view similar to Fig. 3, particularly showing the locking nut in unlocked position;

Fig. 5, an elevational view of a divided or two-part illuminating bowl or globe, showing my invention applied thereto;

Fig. 6, a sectional detail view taken on line VI—VI of Fig. 5, showing a portion of the globe member and the connecter applied thereto.

Referring to the drawings, and as preferred, the connecter device comprises a split ring-like member designated generally by the numeral 5. Member 5 is preferably of annular form and is made from suitable, somewhat flexible, metal and has a channel-like cross section to provide inwardly extending globe-engaging flanges or lips $a$.

The adjacent ends of member 5 are provided with cooperating locking means for locking the ends together, and for this purpose one end of member 5 is formed with a struck-up extension 6, shaped to provide a centrally disposed apertured boss 7, a divided transversely extending flange or lug 8, a leading-in slot 9, and side flanges 10. The flanges 10 are spaced apart at a distance slightly greater than the width of the adjacent end of the ring member, so that when the ends are joined, flanges 10 will receive and overlap the flanged portions $a$ of the said adjacent end.

The cooperating locking means on the other end of member 5 include a threaded pin 11 fixedly secured to the said end and projecting through an aperture boss 12 formed thereon. Mounted on the pin 11 is a hollow nut 13. The bore of the nut is contracted, as shown, at 14 and this portion is internally threaded to cooperate with the threaded pin 11. Pin 11 is provided with a head 15 adapted to engage a face of the contracted portion 14 to limit the outward movement of the nut on the pin.

A finger pin 16 is provided adjacent one of the ends for the purpose of aiding in applying and removing the connecter device from the illuminating fixture or other structure to which the connecter is applied.

A particular application of the invention is shown by Fig. 5 of the drawings. In this view, A designates one member or part of a glass bowl or globe, and B the other member thereof. Fig. 6 particularly shows the manner of connecting the usual flanges 17 formed on the respective members of the globe. It will be noted that the parts of the globe are joined together in such a manner by the connecter device as to permit a small space $b$ between the said flanged portions 17, thereby providing sufficient space to take care of the expansion and contraction of the said members A and B.

It will be understood that the connecter may be readily manipulated to remove it, together with the lower member B of the globe, from the member A when so desired. The removal is effected by turning hollow nut 13 outwardly on the pin 11 sufficiently far to clear the transversely extending divided flange 8 of the extension 6, after which the connecter is moved free of the parts by a slight pressure on the finger pin 16. It will also be understood that the parts may be readily connected by bringing the ends together and entering the pin 11 in the leading-in slot of the extension 6, after which the nut 13 is screwed down tightly on to the boss 7 of the said extension 6.

I claim:

1. A connecter of the character described comprising a split annular member of channel form, cooperating locking means on adjacent ends of said member including a pin and slot connection, said pin being threaded and fixedly secured to an end of the split member, a struck-up extension on an end of the split member having a slot therein and formed with a divided flange for co-operation with a locking nut, and an adjustable locking nut operatively mounted on the pin and having a threaded portion co-operating with the threads of the pin.

2. A connecter of the character described comprising an annular split member having inwardly projecting globe-engaging flanges, co-operating locking means positioned at the ends of the split member and including a threaded pin carried on one end and a struck-up extension on the other end, said struck-up extension having an aperture therein and side and end flanges and of sufficient width to receive the globe engaging flanges of one end of the split member, and an adjustable locking nut mounted on the pin and having a threaded portion co-operating with the threads of the pin.

3. A connecter of the character described comprising an annular split member having inwardly projecting globe-engaging flanges, co-operating locking means positioned at the ends of the split member and including a threaded pin carried on one end and a struck-up extension on the other end of sufficient width to receive the globe engaging flanges of one end of the split member, and an adjustable threaded locking nut mounted on the pin and having its threaded portion engaging the threads of the pin, said struck-up extension having a flange thereon for engaging with the locking nut.

In testimony whereof I affix my signature.

NICHOLAS KOPP.